United States Patent
Huang

(10) Patent No.: US 9,967,213 B2
(45) Date of Patent: May 8, 2018

(54) SYSTEMS AND METHODS FOR PROVIDING INSTANT MESSAGING WITH INTERACTIVE PHOTO SHARING

(71) Applicant: CyberLink Corp., Shindian, Taipei (TW)

(72) Inventor: Chun Jen Huang, Kaohsiung (TW)

(73) Assignee: CYBERLINK CORP., Shindian, Taipei (TW)

( * ) Notice: Subject to any disclaimer, the term of this patent is extended or adjusted under 35 U.S.C. 154(b) by 282 days.

(21) Appl. No.: 14/847,186

(22) Filed: Sep. 8, 2015

(65) Prior Publication Data
US 2016/0261527 A1 Sep. 8, 2016

Related U.S. Application Data

(60) Provisional application No. 62/129,076, filed on Mar. 6, 2015.

(51) Int. Cl.
*G06F 15/16* (2006.01)
*H04L 12/58* (2006.01)

(52) U.S. Cl.
CPC ............ *H04L 51/04* (2013.01); *H04L 51/08* (2013.01)

(58) Field of Classification Search
CPC ............................... H04L 51/04; H04L 51/08
See application file for complete search history.

(56) References Cited

U.S. PATENT DOCUMENTS

| | | | | |
|---|---|---|---|---|
| 7,698,660 B2* | 4/2010 | Sanchez | ............... | G06F 9/4443 715/753 |
| 2004/0145602 A1* | 7/2004 | Sun | .................... | G06F 17/3028 715/720 |
| 2004/0260614 A1* | 12/2004 | Taratino | ................. | G06Q 30/06 705/26.8 |
| 2007/0168490 A1* | 7/2007 | Kent | ................. | G06F 17/30887 709/223 |
| 2009/0199093 A1 | 8/2009 | Chakravarty | | |
| 2013/0151637 A1* | 6/2013 | Bedikian | ................. | H04L 67/22 709/206 |

(Continued)

FOREIGN PATENT DOCUMENTS

| | | |
|---|---|---|
| GB | 2511721 A | 9/2014 |
| WO | 2013149267 A2 | 10/2013 |

OTHER PUBLICATIONS

WeSnap—Split photos with friends by Global Champions. https://itunes.apple.com/us/app/wesnap-split-photos-friends/id932467051?mt=8; updated Jul. 10, 2015.

(Continued)

*Primary Examiner* — Michael A Keller
(74) *Attorney, Agent, or Firm* — McClure, Qualey & Rodack, LLP

(57) ABSTRACT

An instant messaging system is configured to facilitate digital photo sharing. An invitation is transmitted to at least one contact at a corresponding instant messaging system, where the invitation includes a selected digital photo presentation template comprising a plurality of panels. Digital photos are uploaded to a media content server, and digital photos shared by the at least one invited contact are accessed, where the digital photos are arranged in each of the panels of the presentation template according to at least one viewing criterion specified by a user of the instant messaging system.

22 Claims, 17 Drawing Sheets

(56) References Cited

U.S. PATENT DOCUMENTS

| | | | | |
|---|---|---|---|---|
| 2014/0095264 A1* | 4/2014 | Grosz | ................... | G06F 3/0484 |
| | | | | 705/7.36 |
| 2015/0013016 A1* | 1/2015 | Kanter | ................ | G06F 21/6245 |
| | | | | 726/28 |
| 2015/0302533 A1* | 10/2015 | Thakur | .................. | G06Q 10/00 |
| | | | | 705/319 |

OTHER PUBLICATIONS

Split Pic Collage Maker, Photo Editor & Cam Blender: best filter edits plus awesome fx by Easy Tiger Apps, LLC. https://itunes.apple.com/us/app/split-pic-collage-maker-selfie/id570748340?mt=8; updated Aug. 4, 2015.
Rehman, A. "Pixplit Is a Collaborative, Social Photo Collage App for Android & iOS" Feb. 28, 2013.
Neopix instant cam collages. http://www.fotofriend.com/how-neopix-works; 2009.
Padlet online wall for anything. http://padlet.appappeal.com/ Sep. 20, 2013.

* cited by examiner

SYSTEMS AND METHODS FOR PROVIDING INSTANT MESSAGING WITH INTERACTIVE PHOTO SHARING

CROSS-REFERENCE TO RELATED APPLICATION

This application claims priority to, and the benefit of, U.S. Provisional Patent Application entitled, "Systems and Methods for Providing Instant Messaging with Interactive Photo Sharing," having Ser. No. 62/129,076, filed on Mar. 6, 2015, which is incorporated by reference in its entirety.

TECHNICAL FIELD

The present disclosure generally relates to multimedia content and more particularly, to systems and methods for providing an instant messaging platform with interactive photo sharing.

BACKGROUND

Over the years, digital video content has gained increasing popularity with consumers. With the ever-growing amount of digital content available to consumers through the Internet and other sources, consumers have access to a vast amount of content via computers, smartphones, tablets, and so on. With existing photo sharing services, users are able upload and share digital photos with friends. However, it can be time-consuming for users to arrange photos before uploading the photos.

SUMMARY

Briefly described, one embodiment, among others, is a method implemented in an instant messaging system. The method comprises transmitting an invitation to at least one contact at a corresponding instant messaging system, wherein the invitation includes a selected digital photo presentation template comprising a plurality of panels. The method further comprises uploading digital photos to a media content server and accessing digital photos shared by the at least one invited contact, wherein the digital photos are arranged in each of the panels of the presentation template according to at least one viewing criterion specified by a user of the instant messaging system.

Another embodiment is a system for facilitating sharing of digital photos, comprising a processor and a session manager executed by the processor for receiving an invitation generated by an instant messaging system intended for a group of contacts, wherein the invitation includes a selected digital photo presentation template comprising a plurality of panels, wherein among the group of contacts, at least one contact is allotted at least one panel, and wherein each of the group of contacts has a corresponding instant messaging system, the session manager being further configured for forwarding the invitation to each of the contacts. The system further comprises a media content manager executed by the processor for storing digital photos uploaded by each of the instant messaging systems and granting access to the stored digital photos, wherein at each instant messaging system, the digital photos are arranged in each of the panels of the presentation template according to a viewing criterion specified by each instant messaging system.

Another embodiment is a method implemented in a media content server that comprises receiving an invitation generated by an instant messaging system intended for a group of contacts, wherein the invitation includes a selected digital photo presentation template comprising a plurality of panels, wherein among the group of contacts, at least one contact is allotted at least one panel, and wherein each of the group of contacts has a corresponding instant messaging system. The method further comprises forwarding the invitation to each of the contacts, storing digital photos uploaded by each of the instant messaging systems, and granting access to the stored digital photos, wherein at each instant messaging system, the digital photos are arranged in each of the panels of the presentation template according to a viewing criterion specified by each instant messaging system.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Various embodiments are disclosed for incorporating interactive photo sharing features integrated into an instant messaging platform so that friends can share and exchange digital photos in real time while engaging in one or more conversations via text transmission. One or more contacts are invited by a user to participate in a digital photo sharing session, whereby the user shares a selected digital photo presentation template comprising one or more panels for displaying digital photos. For some embodiments, at least one or more of the invited participants are allotted at least one of the panels in the presentation template, whereby each participant is able to populate their allotted panel(s) by uploading content for the remaining participants to view. The system also permits each participant to modify the appearance of the presentation template, thereby allowing each participant to customize how the shared digital photos are viewed on their respective system.

Note that for some implementations, the system may be configured such that one or more of the invited participants are only able to view the photo panels but not populate any of the panels. For example, a user selects a digital photo presentation template comprising three photo panels and sends invitations to a group of twenty friends. The user may assign one or more of the panels to some of the friends and allow them to populate the panels. Alternatively, the user may configure the invitation such that all the friends may view the panels but not populate any of the panels. In this regard, the user has full control over which participates are allowed to upload digital photos and which participates are merely able to view the content in the panels.

In another aspect of various embodiments, each of the participants in the instant messaging session is able to customize the frame shown on their respective displays by modifying, for example, the location, size, shape, color, etc. of the panels within the frame. Furthermore, each participant is able to specify how the photos in each panel of the frame are arranged. For example, one participant may elect to sort photos in one particular panel by time, whereas another participant may elect to sort photos in all the panels based on location. Note that a viewing criterion may be specified on a panel-by-panel basis. A user interface is further provided to each participant that allows the user to upload and annotate photos, thereby enhancing the digital photo sharing session.

Figure 1:
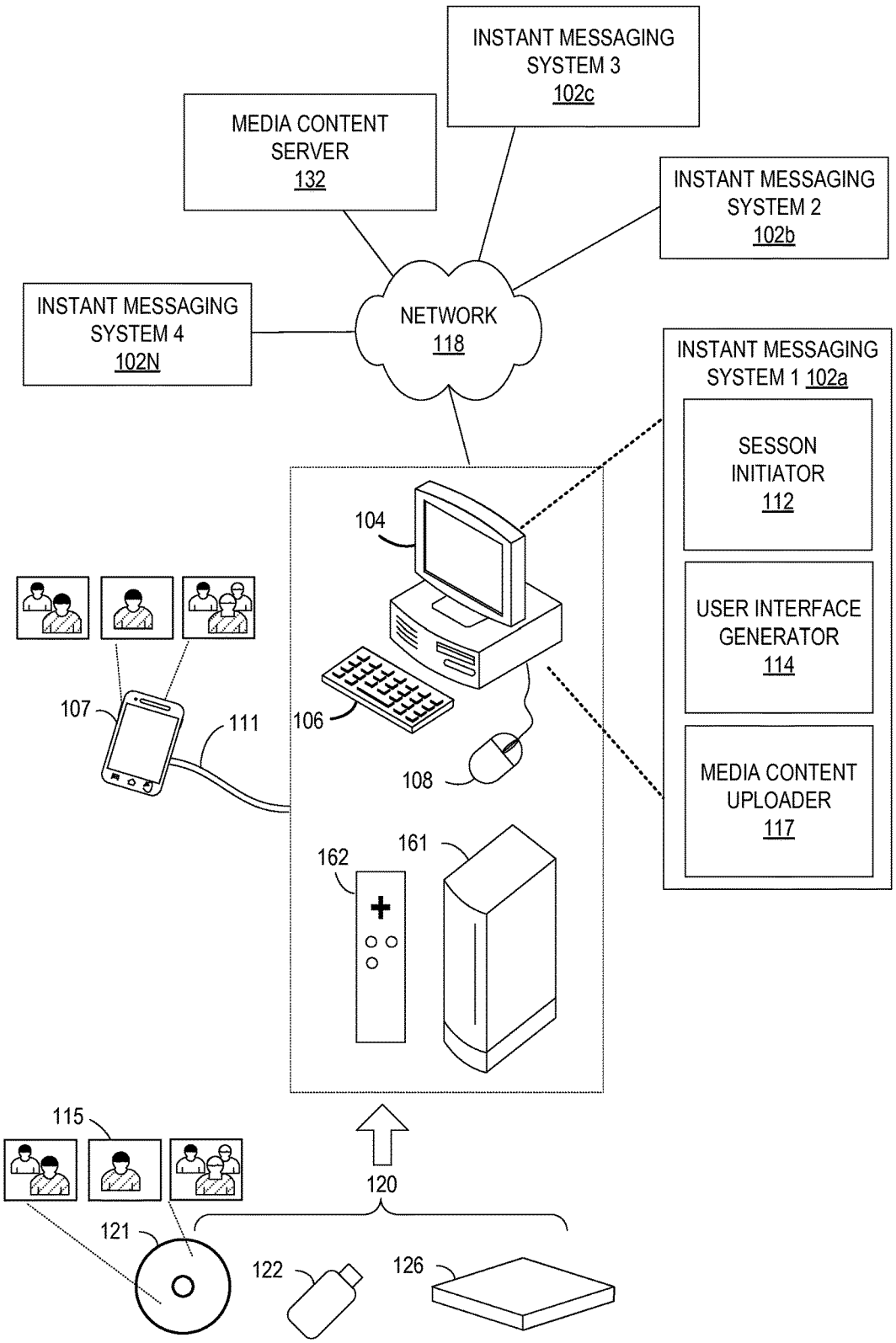
FIG. 1 is a block diagram of a networked environment in which embodiments of an instant messaging platform may be implemented according to various embodiments of the present disclosure.

A description of a system for digital photo sharing utilizing an instant messaging system and a media content server is now described followed by a discussion of the operation of the components within the system. FIG. 1 is a block diagram of a networked environment in which a media content server 132 and a plurality of instant messaging systems 102a-102N are communicatively coupled via a network 118. Each of the instant messaging systems 102a-102N is configured to allow users to share photos, interactively comment on photos, customize frames shown on their respective displays, and so on, while at the same time, participating in an instant messaging session.

Each of the instant messaging systems 102a-102N may be embodied, for example, as a desktop computer, computer workstation, laptop, smartphone, tablet, or other computing system. In other embodiments, the instant messaging systems 102a-102N may be embodied as a video gaming console 161, which includes a video game controller 162 for receiving user input. For such embodiments, the video gaming console 161 may be connected to a television (not shown) or other display.

Each of the instant messaging systems 102a-102N may include a display 104 and input devices such as a keyboard 106 and a mouse 108, and/or touchscreen. Each of the instant messaging systems 102a-102N may be configured to receive digital photos 115 from a tangible storage medium, cloud storage, or other source, where the tangible storage medium 120 may comprise, by way of example and without limitation, a compact disc (CD) 121, a universal serial bus (USB) flash drive 122, and an external hard drive 126. As one of ordinary skill will appreciate, the digital photos 115 may be encoded in various formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files, and so on.

As illustrated in FIG. 1, each of the instant messaging systems 102a-102N may also receive digital photos 115 directly from a device 107 (e.g., smartphone) capable of capturing digital photos, where the instant messaging systems 102a-102N are coupled to the device 107 via a cable 111 or other interface. Each of the instant messaging systems 102a-102N may support any one of a number of common computer interfaces, such as, but not limited to IEEE-1394 High Performance Serial Bus (Firewire), USB, a serial connection, a Bluetooth® connection, and so on.

The instant messaging systems 102a-102N may be coupled to a network 118, such as the Internet or a local area network (LAN), where the instant messaging systems 102a-102N may be configured to communicate directly with each other in a peer-to-peer configuration. Alternatively, the instant messaging systems 102a-102N may be configured to communicate with each other via a media content server 132 in a client-server configuration. Each instant messaging system 102a-102N comprises a session initiator 112 configured to access the user's contacts, whereby the user's contacts may be stored locally on each instant messaging system 102 or stored remotely. For some embodiments, the session initiator 112 may be configured to access the user's contacts list associated with one or more e-mail accounts, online social networking services, and so on for purposes of allowing the user to specify a group of contacts to send an invitation to.

Each of the instant messaging systems 102a-102N further comprises a user interface generator 114 configured to provide a user interface that includes a frame comprising one or more panels for displaying uploaded digital photos 115. Specifically, the user interface is utilize to conduct instant messaging sessions with digital photo sharing capabilities that allow users to share digital photos 115 and interact in real time, where the user interface allows each user to customize the frame shown on their respective displays 104.

The media content uploader 117 is configured to upload digital photos 115 that the user wishes to share with other users, where the digital photos 115 are uploaded to the media content server 132 via the network 118. In this regard, the media content server 132 is configured to receive uploaded digital photos 115 from the various instant messaging systems 102a-102N. For some embodiments, the media content server 132 maintains an account for each user and provides access to the shared digital photos 115 via the panels in the frames shown on each respective instant messaging system 102a-102N.

Figure 2:
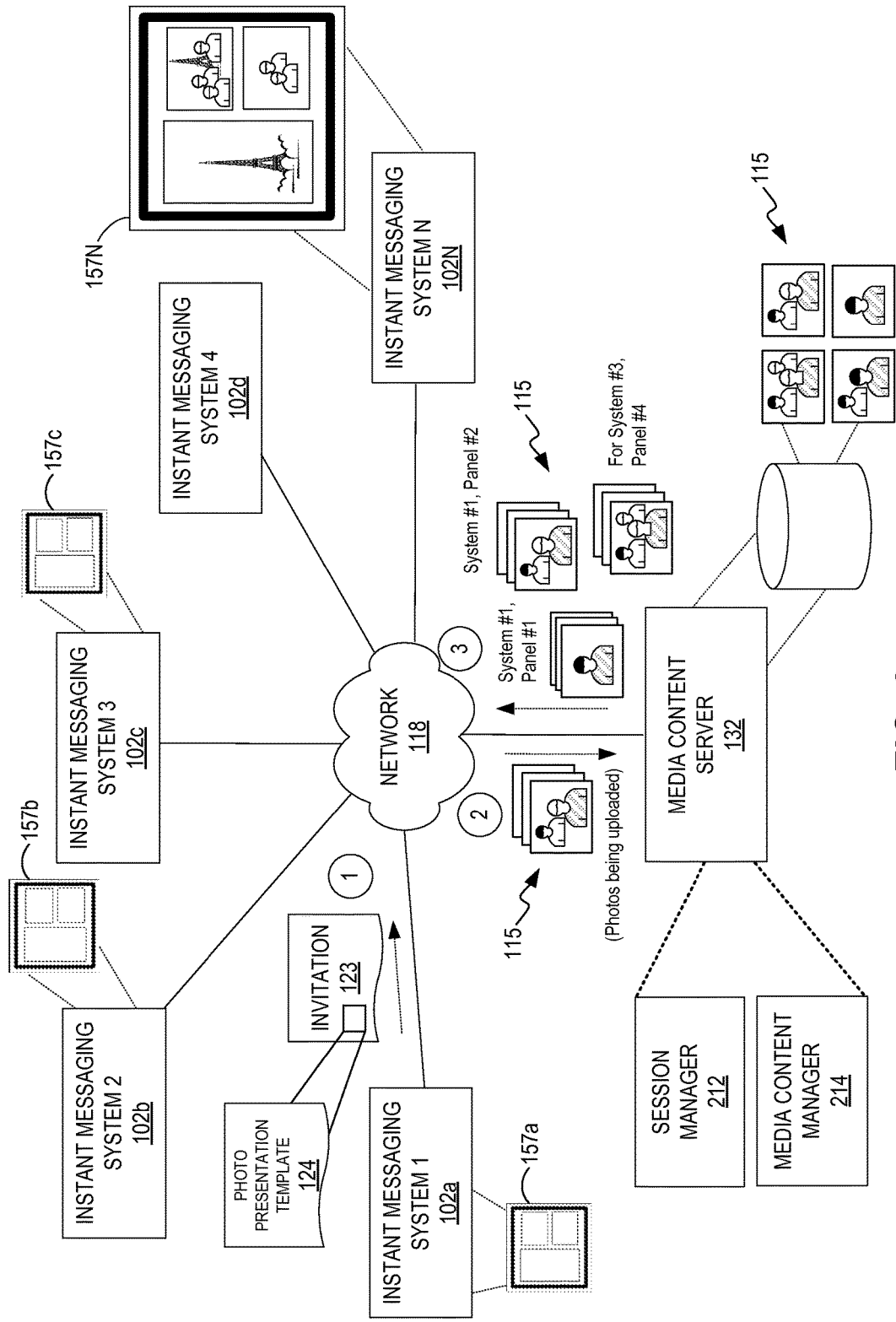
FIG. 2 illustrates the process flow between the components in the networked environment of FIG. 1 according to various embodiments of the present disclosure.

Reference is made to FIG. 2, which illustrates the process flow between the components in the networked environment of FIG. 1. The process begins with the user of instant messaging system 102a (i.e., the host) initiating a digital photo sharing session with a group of friends, where the digital photo sharing session is integrated in an instant messaging platform. The user selects a presentation template 124 with one or more panels and then sends an invitation 123 to each of the friends at corresponding instant messaging systems 102b-102N. Each of the other instant messaging systems 102b-102N receives the invitation 123, which includes the selected presentation template 124.

Each of the instant messaging systems 102a-102N then uploads their respective digital photos 115 to the media content server 132. Specifically, each digital photo includes a specified destination comprising the instant messaging system 102a-102N and the panel in which the digital photo will be viewed in. The media content server 132 then populates each panel in the digital photo presentation templates 157a-157N with the digital photos 115 uploaded from all the instant messaging systems 102a-102N, where each instant messaging system 102a-102N has a designated panel with the frame. As shown, each digital photo presentation templates 157a-157N is shown on a respective instant messaging system 102a-102N.

As described in more detail below, each instant messaging system 102a-102N can specify how photos are arranged in each panel as well as modify the appearance of the digital photo presentation template 157a-157N. The media content server 132 comprises a session manager 212 and a media content manager 214, which may be embodied as hardware and/or software. When embodied as software, the session manager 212 and the media content manager 214 are executed by a processor to perform the operations described in more detail below.

Figure 3:
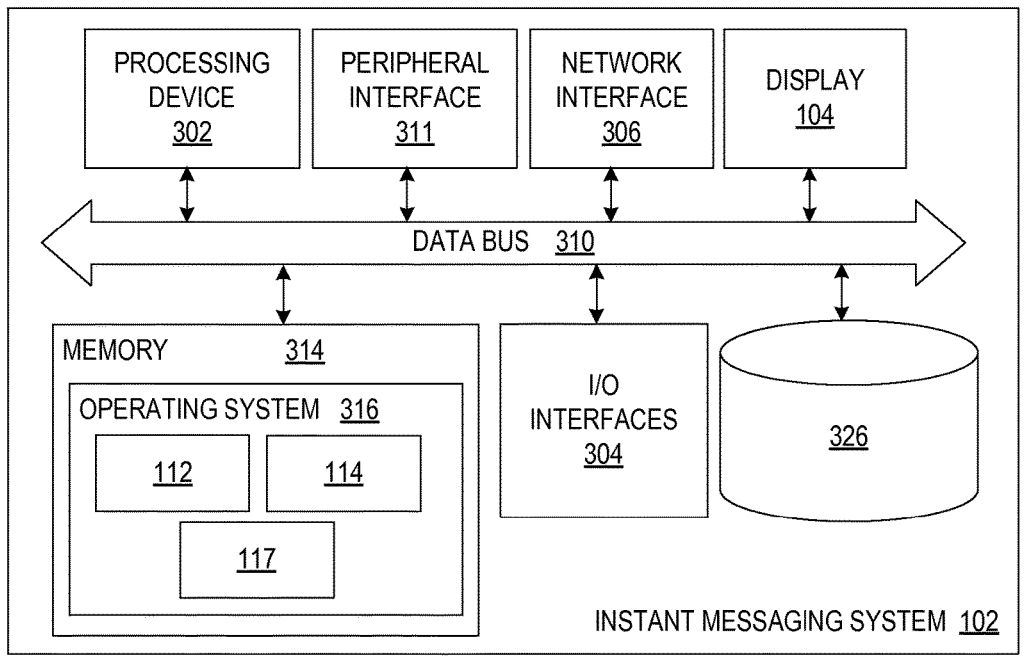
FIG. 3 illustrates an embodiment of the instant messaging systems shown in FIG. 1 according to various embodiments of the present disclosure.
Figure 4:
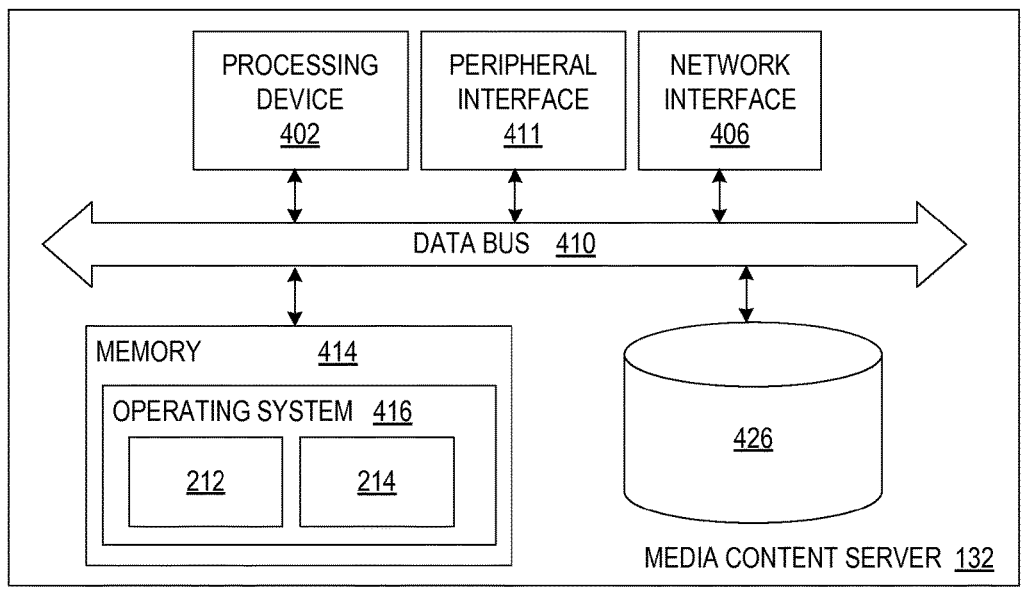
FIG. 4 illustrates an embodiment of the media content server shown in FIG. 1 according to various embodiments of the present disclosure.

FIG. 3 illustrates an embodiment of the instant messaging systems 102a-102N shown in FIG. 1, while FIG. 4 illustrates an embodiment of the media content server 132 shown in FIG. 1. The instant messaging systems 102a-102N and the media content server 132 may be embodied in any one of a wide variety of wired and/or wireless computing devices, such as a desktop computer, portable computer, dedicated server computer, multiprocessor computing device, smart phone, tablet, and so forth.

As shown, each of the instant messaging systems 102a-102N comprises memory 314, a processing device 302, a number of input/output interfaces 304, a network interface 306, a display 104, a peripheral interface 311, and mass storage 326, wherein each of these components are connected across a local data bus 310. Similarly, the media content server 132 comprises memory 414, a processing device 402, a network interface 406, and mass storage 426, wherein each of these components are connected across a local data bus 410.

The processing devices 302, 402 may include any custom made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memories 314, 414 can include any one of a combination of volatile memory elements (e.g., random-access memory (RAM, such as DRAM, and SRAM, etc.)) and nonvolatile memory elements (e.g., ROM, hard drive, tape, CDROM, etc.). The memories 314, 414 typically comprise a native operating system 316, 416, one or more native applications, emulation systems, or emulated applications for any of a variety of operating systems and/or emulated hardware platforms, emulated operating systems, etc. For example, for the instant messaging systems 102a-102N depicted in FIG. 1, the applications may include application specific software which may comprise some or all the components 112, 114, 117 of the instant messaging systems 102a-102N. In accordance with such embodiments, the components 112, 114, 117 are stored in memory 314 and executed by the processing device 302. Similarly, for the media content server 132 depicted in FIG. 1, the applications may include application specific software which may comprise some or all the components 212, 214 of the media content server 132, where the components 212, 214 are stored in memory 414 and executed by the processing device 402. One of ordinary skill in the art will appreciate that the memories 314/414 can, and typically will, comprise other components which have been omitted for purposes of brevity.

Input/output interfaces 304 provide any number of interfaces for the input and output of data. For example, where the instant messaging systems 102a-102N comprises a personal computer, these components may interface with one or more user input/output interfaces 304, which may comprise a keyboard or a mouse, as shown in FIG. 3. The display 104 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 5:
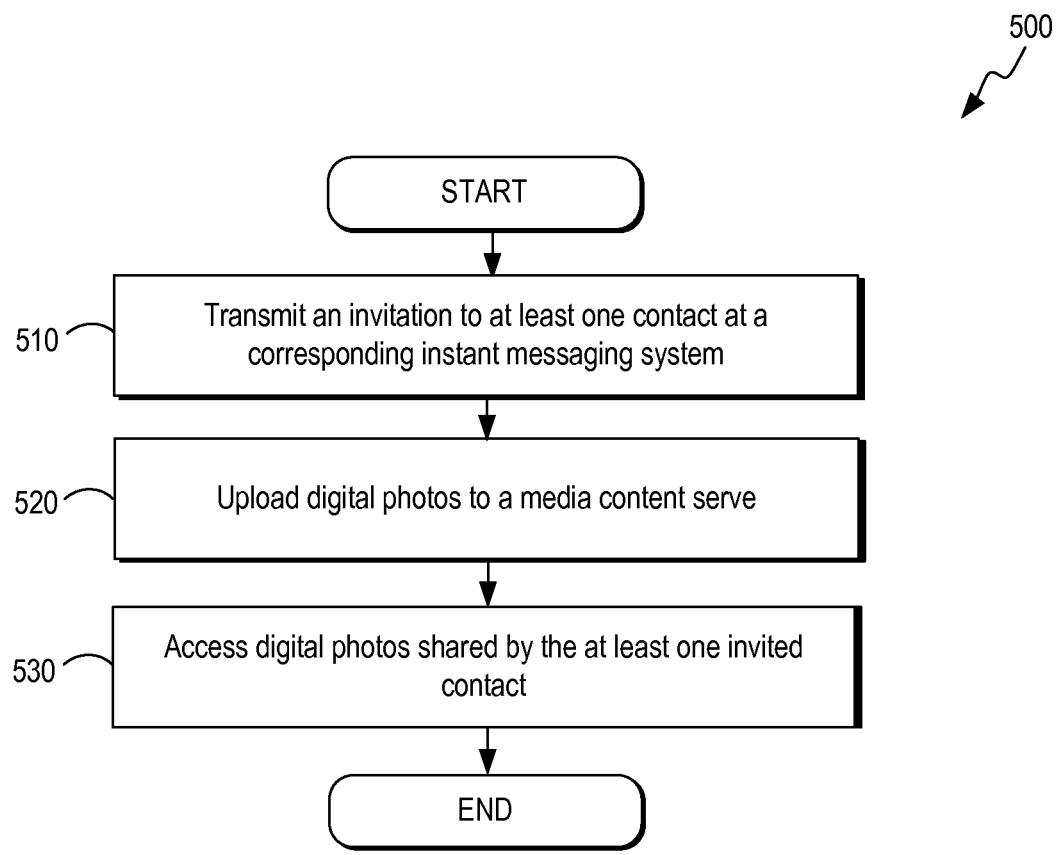
FIG. 5 is a top-level flowchart illustrating examples of functionality implemented as portions of the instant messaging system of FIG. 1 for facilitating digital photo sharing according to various embodiments of the present disclosure.

Reference is made to FIG. 5, which is a top-level flowchart illustrating examples of functionality implemented as portions of the instant messaging system 102a of FIG. 1 for facilitating digital photo sharing according to various embodiments of the present disclosure. While the features described below may be embodied as hardware, the features may alternatively be embodied as computer-implemented functionality where the processing device 302 (FIG. 3) of the instant messaging system 102a is programmed to execute the operations described in the flow chart below.

Beginning with block 510, the host of the digital photo sharing session utilizes the instant messaging system 102a to transmit an invitation to at least one contact at a corresponding instant messaging system 102b-102N (FIG. 1), where the user of the instant messaging system 102a (i.e., host) wishes to participate in a digital photo sharing session with the at least one contact. For some embodiments, the invitation includes a selected digital photo presentation template comprising at least one panel. For some embodiments, at least one of the contacts is allotted at least one panel that will be populated with digital photos uploaded by that contact for others to view. In this regard, the host may elect to send invitations to a group of contacts to participate in the digital photo sharing sessions but only allot panels to a subset of the contacts such that the remaining contacts may only view the shared digital photos. For example, the host may send invitations to 20 contacts to participate in the digital photo sharing session while only allotting a panel to 3 of those contacts. Thus, while 3 of the contacts are able to populate their respective panel(s), the remaining contacts may only view the shared digital photos uploaded to the panels. In block 520, the instant messaging system 102a uploads digital photos to a media content server for others to view. For some embodiments, the uploaded digital photos may then be displayed and arranged in one of the panels of the digital photo presentation template.

In block 530, the instant messaging system 102a accesses digital photos shared by the at least one invited contact. For some embodiments, the digital photos are arranged in each of the panels of the presentation template according to at least one viewing criterion specified by a user of the instant messaging system. For example, the digital photos may be arranged in the panels according to time, location, subject, and so on. Note that the viewing criterion may be specified on a panel-by-panel basis such that digital photos may be arranged differently in each panel of the digital photo presentation template.

Figure 6:
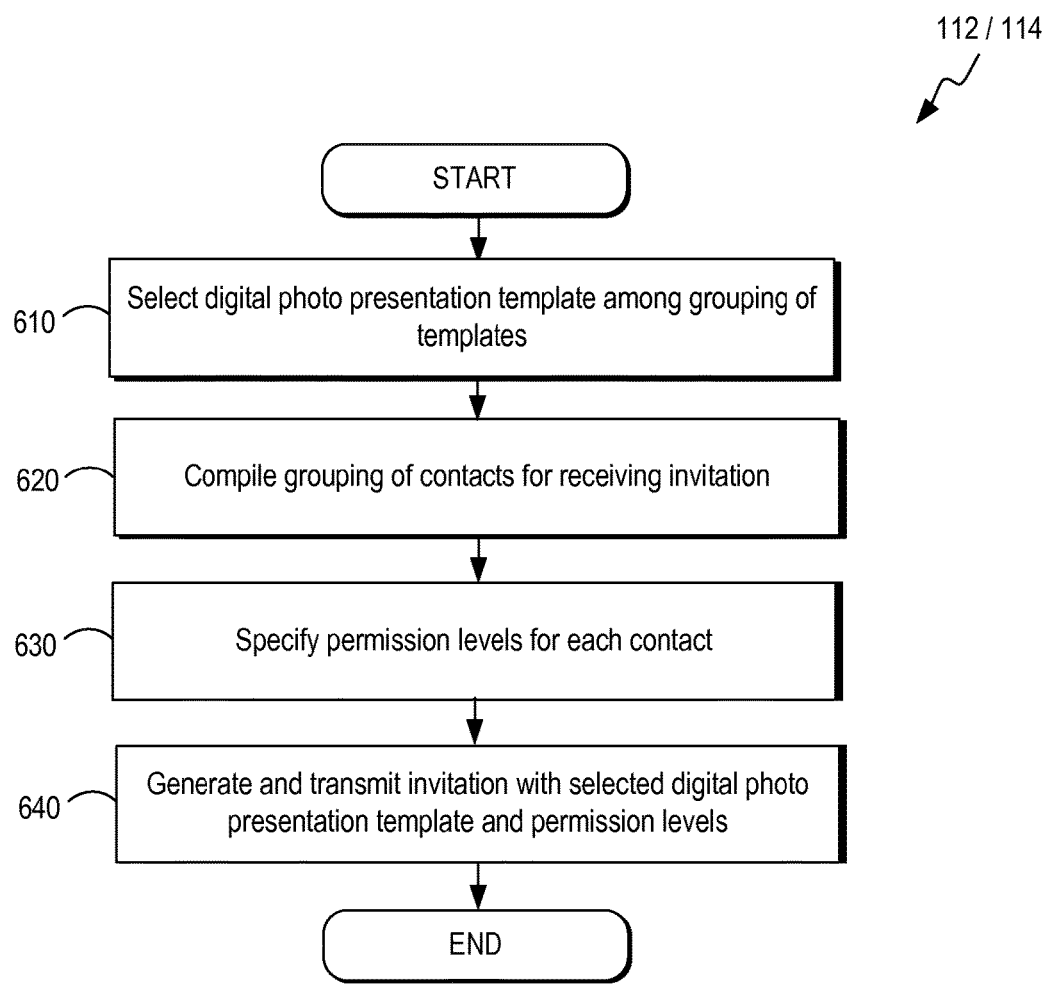
FIG. 6 illustrates operations performed by the session initiator and the user interface generator of the instant messaging system according to various embodiments of the present disclosure.

FIG. 6 provides additional details regarding the transmission of invitations by the instant messaging system 102a (FIG. 1) as described in connection with FIG. 5 above. Specifically, FIG. 6 illustrates operations performed by the session initiator 112 and the user interface generator 114 of the instant messaging system 102a in accordance with various embodiments. While the session initiator 112 and the user interface generator 114 may be embodied as hardware, the session initiator 112 and the user interface generator 114 may alternatively be embodied as computer-implemented functionality where the processing device 302 (FIG. 3) of the communication device 102a is programmed to execute the operations described in the flow chart below.

Beginning with block 610, the user interface generator 114 provides the user of the instant messaging system 102a (i.e., host) with a user interface to facilitate selection of a digital photo presentation template for purposes of sharing digital photos. Using the use interface, the host selects a digital photo template, which may later be modified or customized by each respective viewer invited to participate in the digital photo sharing session.

In block 620, the session initiator 112 compiles a list of prospective contacts for receiving an invitation to participate in the digital photo sharing session. For some embodiments, the session initiator 112 is configured to access the host's contacts, whereby the host's contacts may be stored locally on each instant messaging system 102a or stored remotely in cloud storage. For some embodiments, the session initiator 112 may also be configured to access the host's contacts list associated with one or more e-mail accounts, online social networking services, and so on.

Figure 17:
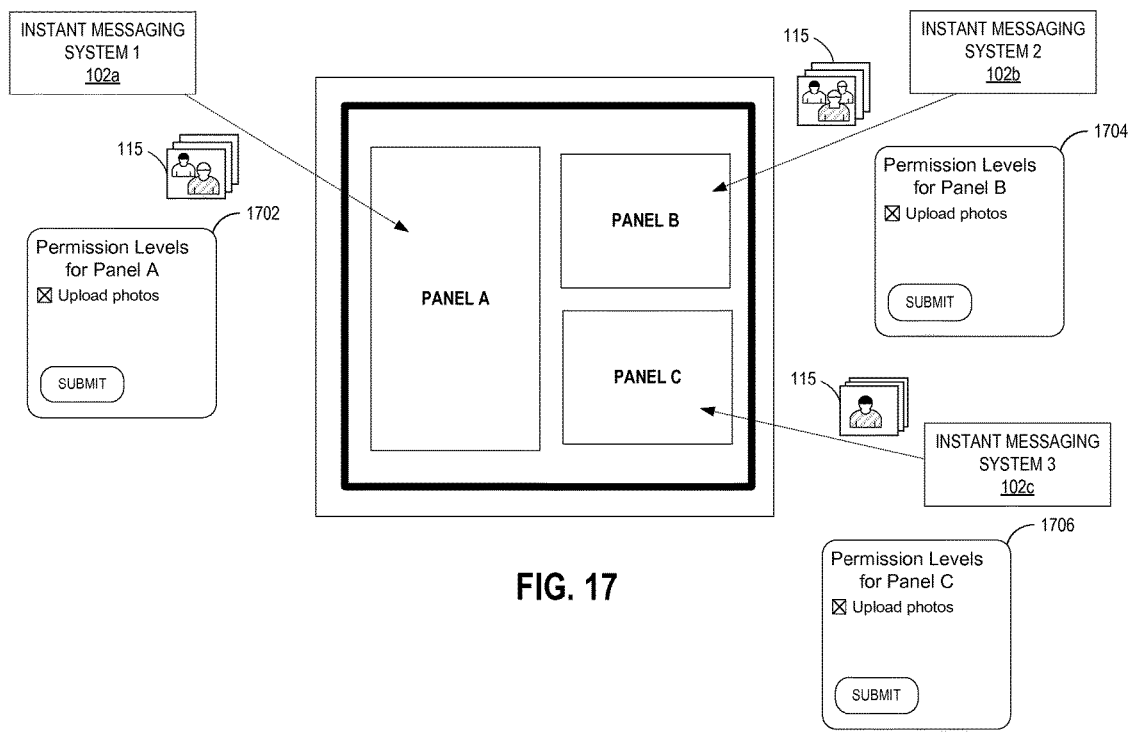
FIG. 17 illustrates an example user interface with various checkbox controls for specifying permission levels for each panel according to various embodiments of the present disclosure.

In block 630, the host initiating the digital photo sharing session specifies the permission levels for each contact that will receive an invitation to participate in the digital photo sharing session. To illustrate, reference is made to FIG. 17, which illustrates an example user interface with various checkbox controls 1702, 1704, 1706 for specifying permission levels for each panel. Specifically, the checkbox controls 1702, 1704, 1706 allow the host to set the respective permission level for each participant of the digital photo sharing session. As shown, the permission levels may be set via a user interface generated by the user interface generator 114, where the permission levels specify whether which each contacts has permission to upload digital photos to one or more panels of the selected digital photo presentation template. For example, the user may elect to only allow certain contacts to view but not upload digital photos in the digital photo presentation template.

Generally, all the invited contacts will be allowed to modify an appearance of the digital photo presentation template and to also specify a viewing criterion. Specifically, modifying the appearance of the digital photo presentation template may include rearranging placement of at least one of the panels within the digital photo presentation template, resizing at least one of the panels, and/or inserting graphics (via an input device/interface such as a touchscreen interface in combination with a stylus or finger) into the digital photo presentation template. Modifying the appearance of the digital photo presentation template may also include inserting text (e.g., superimposing text onto or around objects in digital photos), and so on.

The invited contacts may also specify at least one viewing criterion for arranging digital photos in each of the panels of the digital photo presentation template. For example, the user may elect to allow all contacts participating in the digital photo sharing session to arrange digital photos in the panels according to time, location, subject, and so on. As shown, the permission levels may be specified by the host on a panel-by-panel basis.

To further illustrate, consider an example scenario where twenty contacts are invited to participate in a digital photo sharing session. Of the twenty contacts, five of the contacts have been allotted one or more panels and have been granted permission to populate their respective panel(s) with digital photos, while the remaining fifteen contacts are only able to view digital photos uploaded to the panels.

With reference back to FIG. 2, it should be noted that the photo presentation template 124 sent to each contact via the invitation 123 will initially look the same on each display of the various instant messaging systems 102a-102N. Each contact may then freely modify the appearance of the photo presentation template 124 shown on their respective display. For example, a contact may elect to hide one or more panels in the photo presentation template 124. Alternatively, a contact may elect to add new panels into the photo presentation template 124. For example, a contact may wish to add new panels for purposes of having multiple panels for viewing photos uploaded by another contact. If desired, the contact may then specify a different viewing criterion for each panel. Each contact may specify a viewing criterion for each panel such that the digital photos are sorting according to time, location, objects depicted in the digital photos, individuals depicted in the digital photos, and so on. In this regard, each contact is able to fully customize the photo presentation template 124 shown on their respective display.

Referring back to FIG. 6, in block 640, the session initiator 112 generates and transmits an invitation that includes the selected digital photo presentation template as well as the permission level(s) for each contact. As described in more detail below, the invitation may be transmitted to the media content sever 132 (FIG. 1), which then routes the invitation to each contact invited to participate in the digital photo sharing session. In other embodiments, the invitations may be transmitted to the instant messaging systems 102b-102N (FIG. 1) of the contacts invited to participate in the digital photo sharing session.

Figure 7:
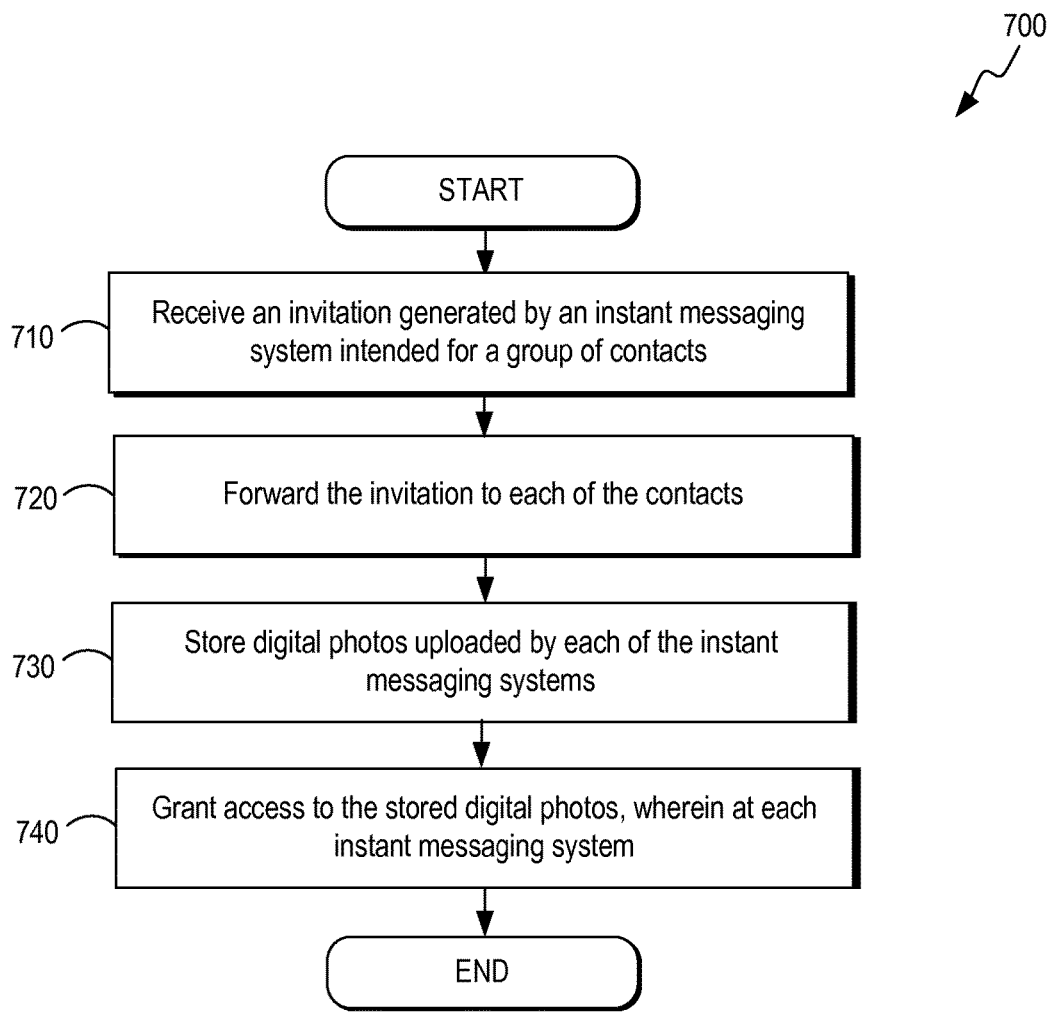
FIG. 7 is a top-level flowchart illustrating examples of functionality implemented as portions of the media content server of FIG. 1 for facilitating digital photo sharing according to various embodiments of the present disclosure.

Reference is made to FIG. 7, which is a top-level flowchart illustrating examples of functionality implemented as portions of the media content server 132 of FIG. 1 for facilitating digital photo sharing according to various embodiments of the present disclosure. While the features described below may be embodied as hardware, the features may alternatively be embodied as computer-implemented functionality where the processing device 302 (FIG. 3) of the instant messaging system 102a is programmed to execute the operations described in the flow chart below.

Beginning with block 710, the media content server 132 receives an invitation generated by an instant messaging system 102a (FIG. 1), where the invitation is intended for a group of contacts at corresponding instant messaging systems 102b-102N (FIG. 1). The invitation includes a selected digital photo presentation template comprising a plurality of panels, where for some embodiments, each contact is allotted a panel.

In block 720, the media content server 132 forwards the invitation to each of the contacts at their corresponding instant messaging systems 102b-102N. In block 730, the media content server 132 receives digital photos uploaded by the instant messaging systems 102a-102N and stores the digital photos in respective folders. In block 740, the media content server 132 grants access by the instant messaging systems 102a-102N to the stored digital photos by populating each panel in each digital photo presentation template shown on each respective display of the instant messaging systems 102a-102N. At each instant messaging system, the digital photos are arranged in each of the panels of the presentation template according to a viewing criterion specified by each instant messaging system 102a-102N. In this regard, each user is able to modify or customize the appearance of their respective digital photo presentation template. As described above, for some embodiments, the users can only modify or customize the appearance of their respective digital photo presentation template if they are granted permission to do so by the host who initiated the digital photo sharing session.

Figure 8:
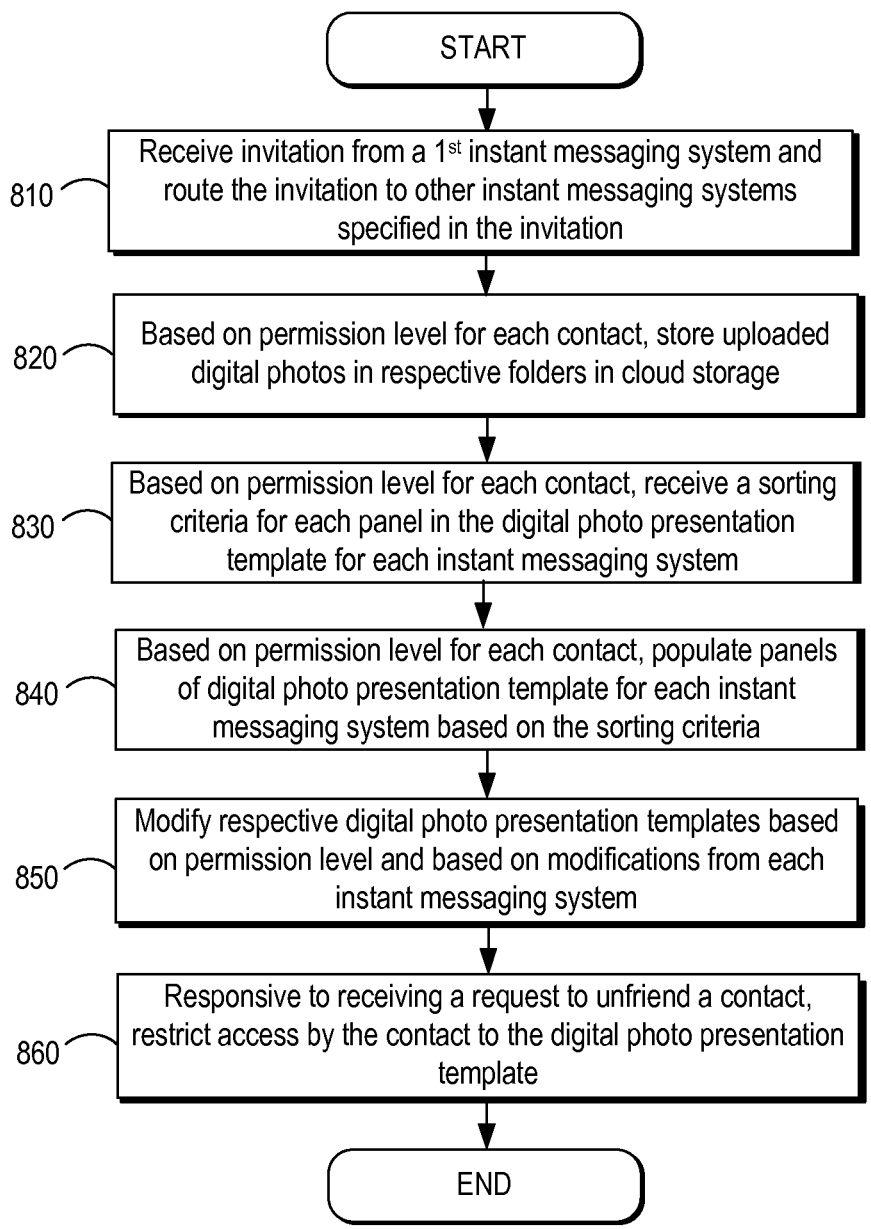
FIG. 8 illustrates operations performed by the session manager and the media content manager of the media content server according to various embodiments of the present disclosure.

FIG. 8 provides additional details regarding the routing of invitations and sharing of digital photos by the media content server 132 (FIG. 1) as described above in connection with FIG. 7. Specifically, FIG. 8 illustrates operations performed by the session manager 212 and the media content manager 214 of the media content server 132 in accordance with various embodiments. While the session manager 212 and the media content manager 214 may be embodied as hardware, the media content manager 214 of the media content server 132 may alternatively be embodied as computer-implemented functionality where the processing device 402 (FIG. 4) of the media content server 132 is programmed to execute the operations described in the flow chart below.

Beginning with block 810, the session manager 212 receives an invitation from a first instant messaging system 102a (FIG. 1) and routes the invitation to the other instant messaging systems 102b-102N specified in the invitation. In block 820, the media content manager 214 receives digital photos uploaded by the instant messaging systems 102a-102N and then stores the uploaded digital photos in the media content server 132 or in another cloud storage device. For some embodiments, the instant messaging systems 102b-102N of the users invited to participate in the digital photo sharing session are able to upload digital photos only if the users are given permission to do so. In this regard, the media content manager 214 assesses the permission level for each user before allowing the user to upload digital photos.

In block 830, the media content manager 214 receives a viewing criterion for each panel in each digital photo frame from each of the instant messaging systems 102a-102N. Again, for some embodiments, the instant messaging systems 102b-102N of the users invited to participate in the digital photo sharing session are able to specify a viewing criterion for each panel only if the users are given permission to do so. For example, the users may elect to allow all contacts participating in the digital photo sharing session to arrange digital photos in the panels according to time, location, subject, and so on.

In block 840, the media content manager 214 populates each panel with the uploaded digital photos and arranges the uploaded digital photos based on the specified viewing criterion. In block 850, the media content manager 214 modifies digital photo frames based on edits made by each instant messaging system 102a-102N. Modification of digital photo frames may be restricted to users who have been granted permission to do so. In block 860, the session manager 212 receives a request to unfriend a contact. In response to receiving an unfriend request, the media content manager 214 restricts or blocks access by the unfriended contact to the photos in the digital photo frame. In some embodiments, the unfriended contact is only blocked from accessing digital photos of the user who generated the unfriend request.

It should be emphasized that the various flowcharts described above provide merely examples of the many different types of functional arrangements that may be employed to implement digital photo sharing in the networked environments shown in FIGS. 1 and 2. As an alternative, the flowcharts may be viewed as depicting examples of steps of a method implemented in the components shown in FIGS. 1 and 2 according to one or more embodiments. Although each of the flowcharts shows a specific order of execution, it is understood that the order of execution may differ from that which is depicted. For example, the order of execution of two or more blocks may be scrambled relative to the order shown. Also, two or more blocks shown in succession may be executed concurrently or with partial concurrence. It is understood that all such variations are within the scope of the present disclosure.

Figure 9A:
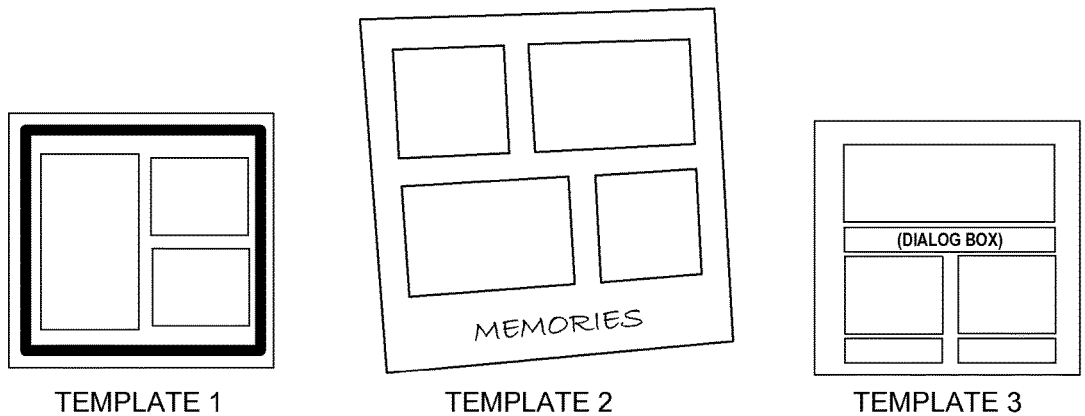
FIGS. 9A and 9B illustrate presentation templates with varying panel layouts according to various embodiments of the present disclosure.
Figure 9B:
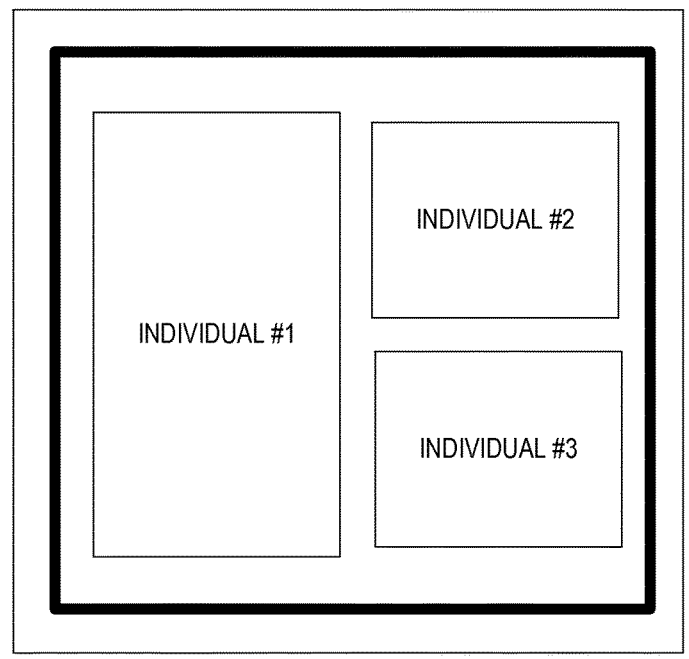
Figure 10:
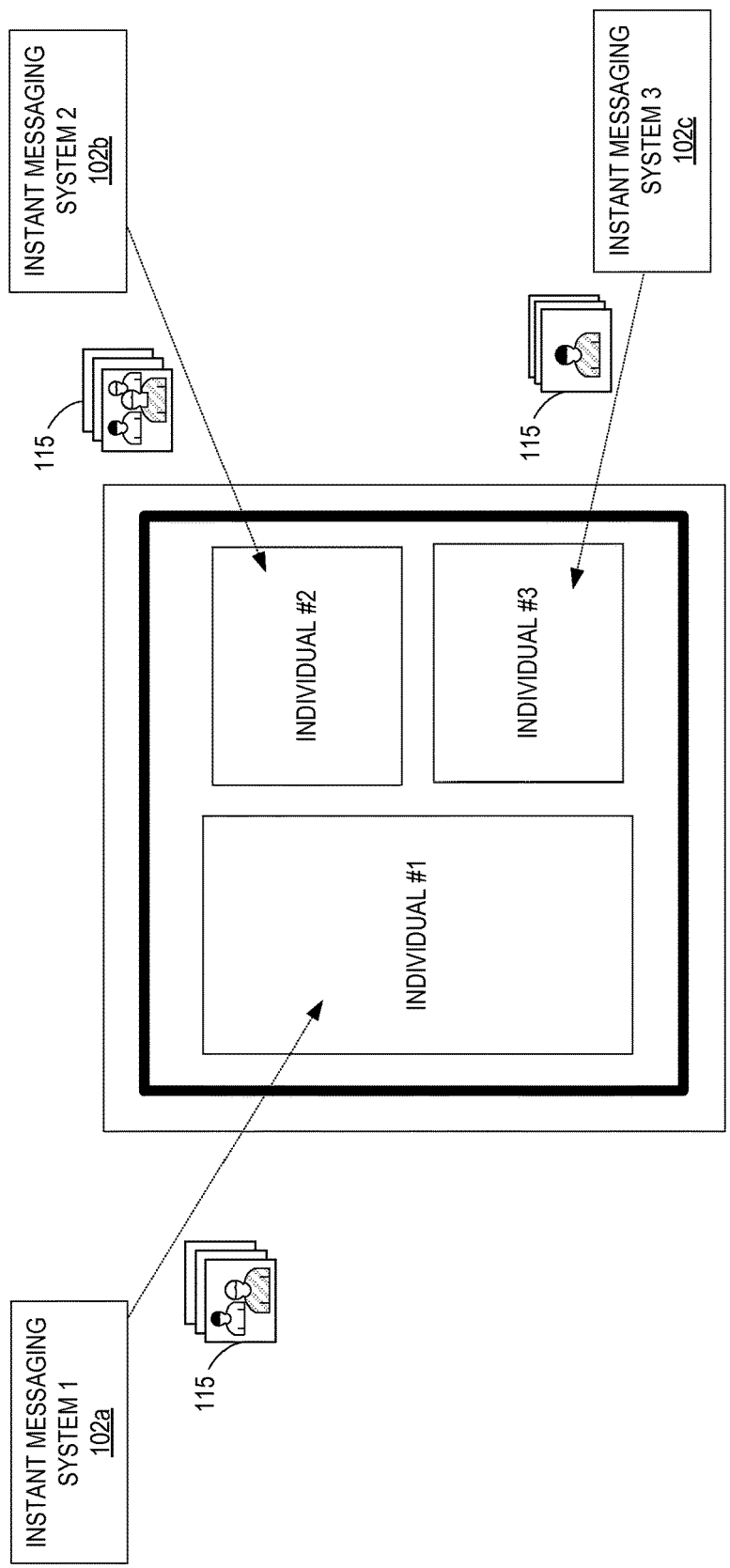
FIG. 10 illustrates how each of the instant messaging systems in FIG. 1 shares digital photos in their respective panel via the photo server according to various embodiments of the present disclosure.

To further illustrate the features described above, reference is made to the following figures. FIG. 9A shows an example of multiple presentation templates with varying panel layouts that a user initiating an instant messaging session may select from. As shown in FIG. 9B, each panel is assigned to a different friend that the user wishes to invite, thereby allowing one or more friends of the user to share digital photos 115 (FIG. 1) in their respective panel(s). Note that each contact may be allotted one or more panels for purposes of sharing digital photos 115. FIG. 10 illustrates how each of the instant messaging systems 102a-102N shares digital photos 115 in their respective panel via the media content server 132 (FIG. 1), which populates each panel in the frame with digital photos uploaded by each instant messaging system 102a-102c.

For some embodiments, the photo presentation template may be implemented in a picture-in-picture (PIP) configuration or split-screen configuration. For example, the display may be arranged such that a main panel is located in an upper portion of the display while the lower portion of the display may include other smaller sub-panels. The main panel may be utilized for displaying photos and/or for participating in instant messaging (IM) chats, while the sub-panels may be utilized for viewing digital photos uploaded by other participants of the photo sharing session.

As discussed earlier, each user participating in the digital photo sharing session may customize the frame shown on their respective displays. The presentation template sent by the user who initiated the instant messaging session serves as a default template, and each of the other users may then modify the size, shape, location, etc. of each of the panels. Furthermore, each user is given the flexibility of specifying how the digital photos 115 (FIG. 1) are arranged in each panel.

Figure 11A:
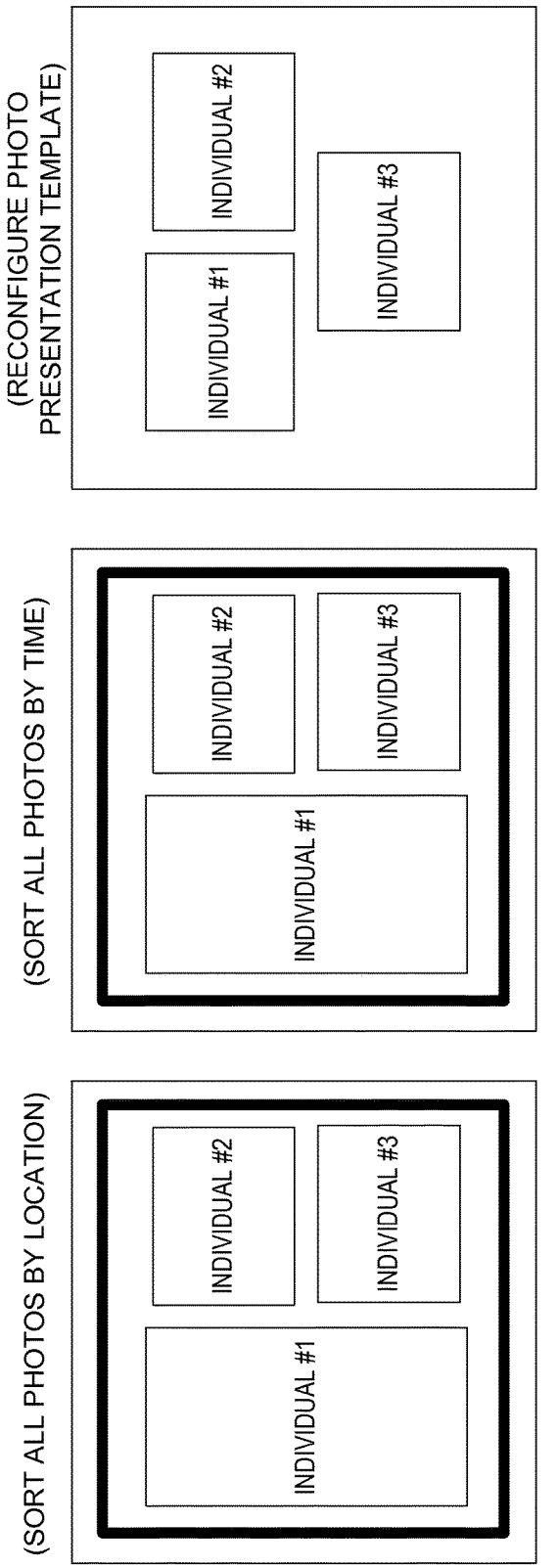
FIG. 11A illustrates customization of the panels by different users according to various embodiments of the present disclosure.

In the example shown in FIG. 11A, one user elects to arrange the digital photos 115 according to location, whereas another user elects to arrange the digital photos 115 by time. Note that the user may specify how digital photos 115 are arranged on a panel-by-panel basis. Thus, one panel in a given frame may display digital photos 115 according to location while another panel within the same frame may display digital photos 115 according to time. In the example shown, individual #1 elects to view the digital photos 115 sorted based on location, whereas individual #2 elects to view the digital photos 115 sorted based on time. Furthermore, individual #3 has elected to simply resize one of the panels and rearrange the layout of the panels, as shown. In this case, the digital photos 115 are arranged according to the sorting arrangement specified by the user who selected the original presentation template.

Figure 11B:
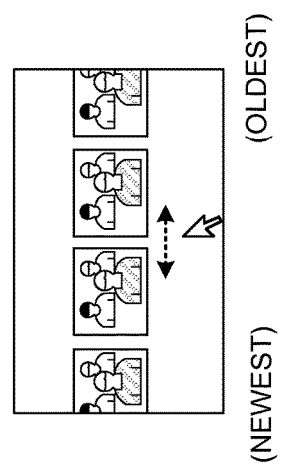
FIG. 11B illustrates how users are able to browse through digital photos in a panel where the digital photos are sorted by time according to various embodiments of the present disclosure.

FIG. 11B illustrates a photo browsing feature provided in each panel. In the example shown, the digital photos are sorted by time. As shown, users may browse through the digital photos by performing a dragging motion using a mouse. Alternatively, users may browse through the digital photos using their finger on a touchscreen interface. For some embodiments, the digital photos may be displayed to the viewer in a slideshow or in an animated manner, where the digital photos are shown, for example, in conjunction with a zooming or panning effect or where transition effects are inserted between digital photos in the slideshow.

Figure 12:
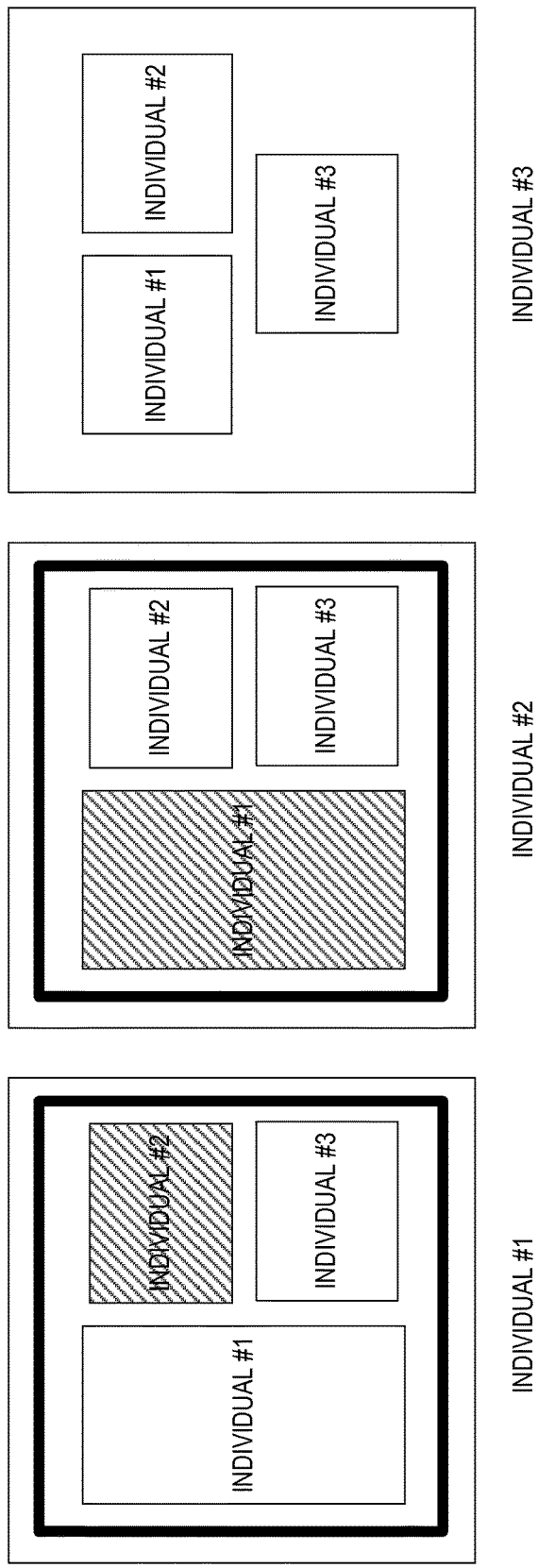
FIG. 12 illustrates a blocking feature in the disclosed instant messaging system according to various embodiments of the present disclosure.

FIG. 12 illustrates a blocking feature implemented in the disclosed instant messaging system 102a-102N (FIG. 1). In one scenario, individual #1 wishes to "unfriend" individual #2 or vice versa. The instant messaging system 102a-102N will then block access to the shared digital photos 115 (FIG. 1) such that neither individual is able to view digital photos 115 of the other individual, as shown by the blacked-out panels. However, individual #3 will continue to have access to the digital photos 115 of both individual #1 and individual #2. Similarly, individual #1 and individual #2 will each continue to have access to the shared digital photos 115 of individual #3.

Figure 13A:
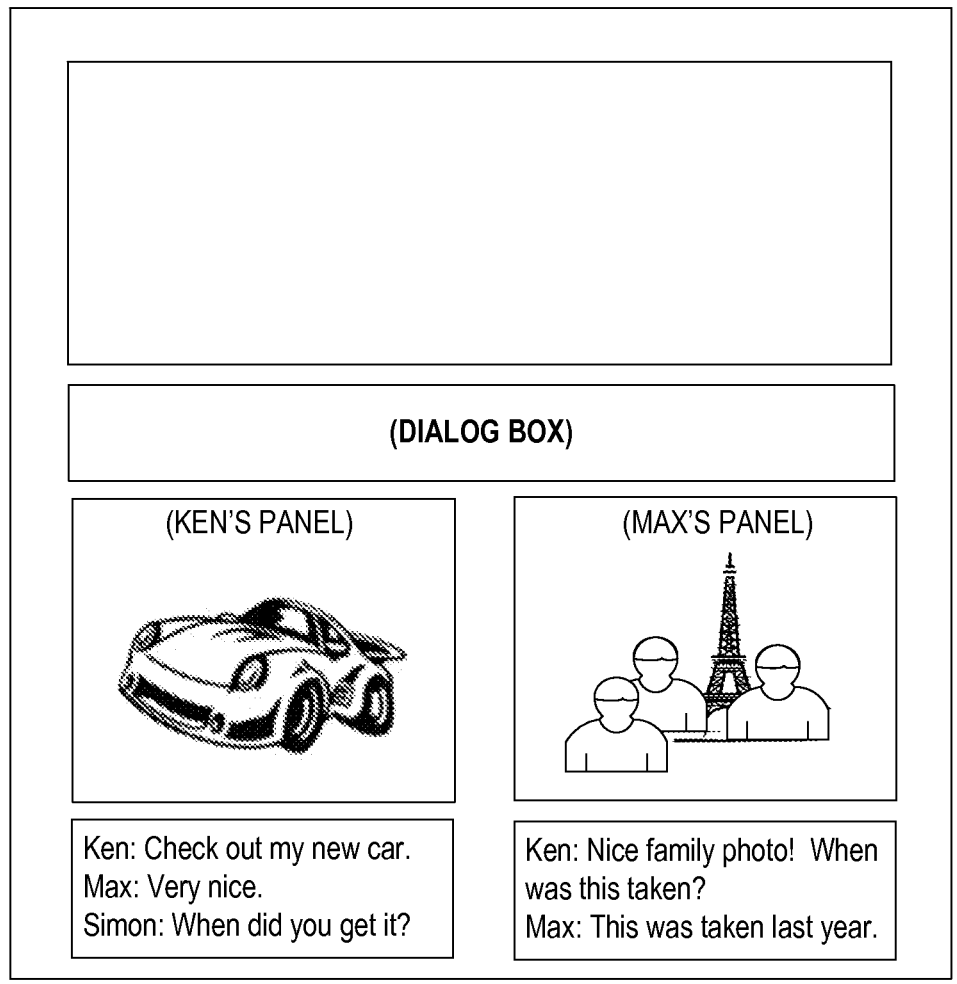
FIGS. 13A and 13B illustrate how various users may comment on digital photos shared by one of the users according to various embodiments of the present disclosure.
Figure 13B:
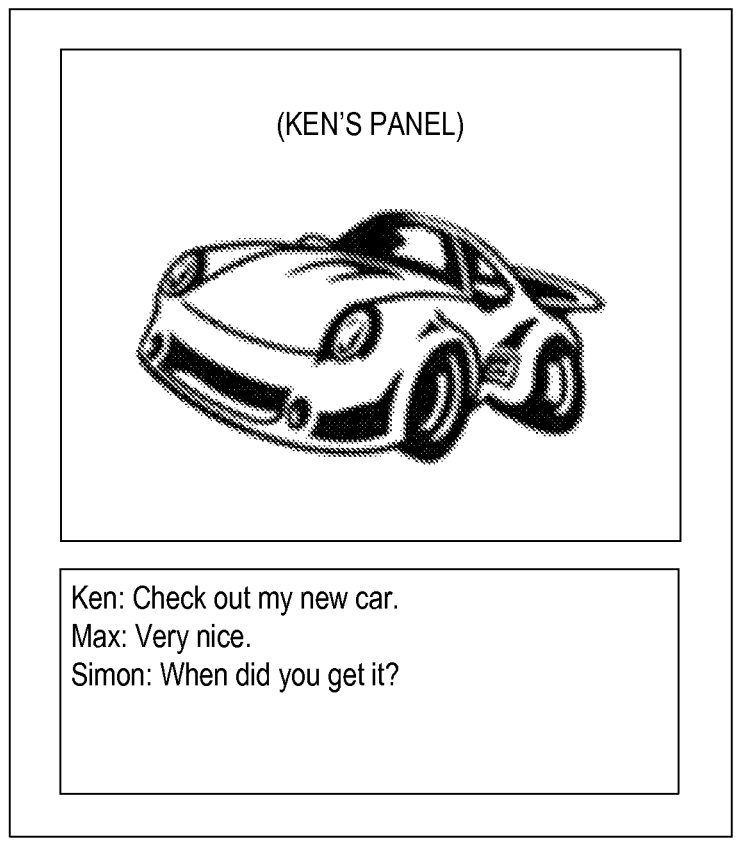
Figure 14:
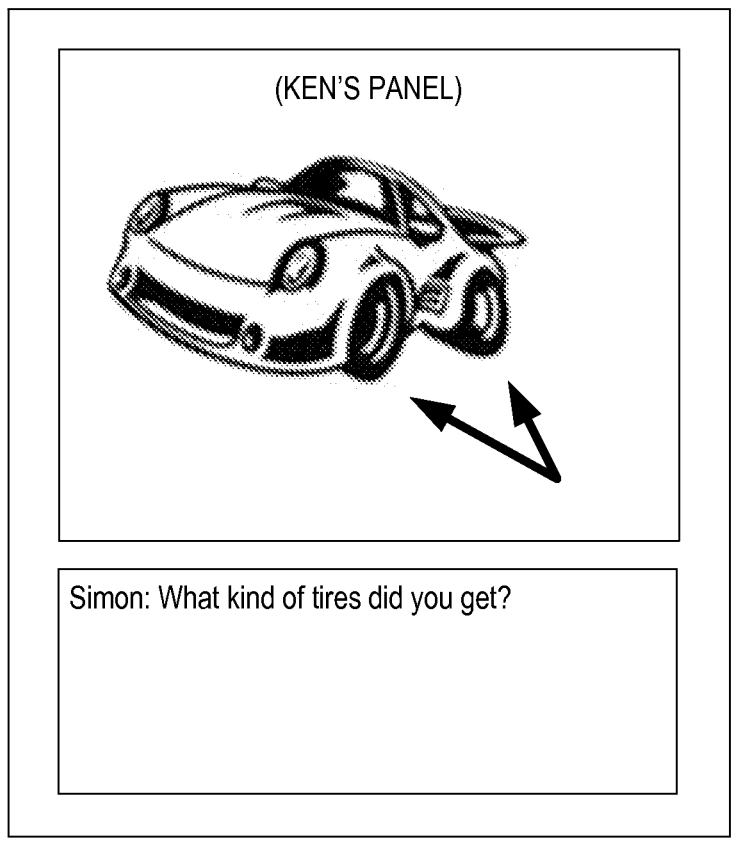
FIG. 14 illustrates a feature whereby users insert graphics into a shared digital photo according to various embodiments of the present disclosure.

The disclosed instant messaging platform facilitates interaction among the users by allowing them to comment in real time on shared digital photos 115 (FIG. 1). FIGS. 13A and 13B illustrate how the various users may comment on digital photos 115 (FIG. 1) shared by one of the users. As shown in the layout of FIG. 13A, users may participate in multiple exchanges at the same time. In the example shown, Max and Simon are commenting on a digital photo shared by Ken while in another panel, Ken is commenting on a digital photo shared by Max. FIG. 13B illustrates a layout where various users comment on a digital photo 115 shown in full-screen mode. For such embodiments, the users may select an active panel and engage in a discussion relating to the active panel, which is shown in full-screen mode. FIG. 14 illustrates a feature whereby users may insert graphics into a shared digital photo. In the example shown, Simon has inserted arrows into a digital photo shared by Ken.

Figure 15:
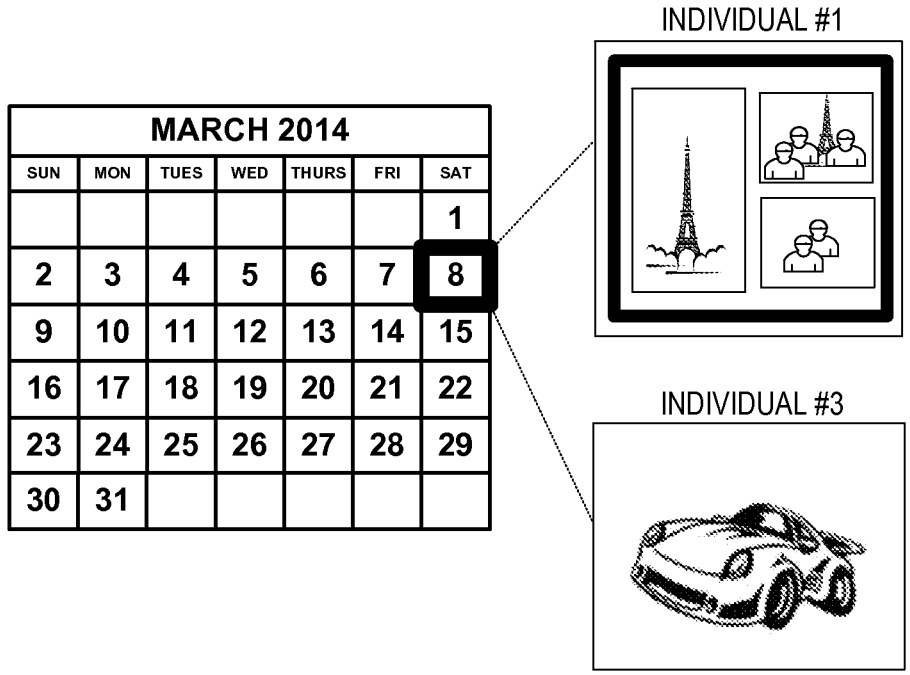
FIG. 15 illustrates a calendar feature of the disclosed instant messaging system according to various embodiments of the present disclosure.
Figure 16:
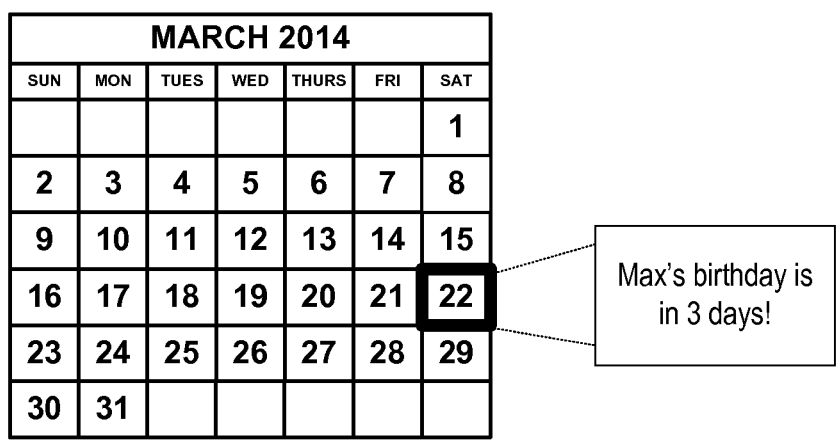
FIG. 16 illustrates another calendar feature of the disclosed instant messaging system where the instant messaging system of FIG. 1 is further configured to display reminders to users to facilitate user interaction according to various embodiments of the present disclosure.

FIG. 15 illustrates a calendar feature of the disclosed instant messaging where the instant messaging system 102a-102N (FIG. 1) is further configured to show users digital photos that were taken on a particular day. Note that the digital photos may comprise the digital photos shared by all the users. For example, in the calendar shown, the instant messaging system 102a-102N shows the photos taken on March 8$^{th}$ by both individual #1 and individual #3, thereby providing users with an efficient means for accessing shared digital photos sorted according to when the digital photos were taken. FIG. 16 illustrates another calendar feature of the disclosed instant messaging where the instant messaging system 102a-102N (FIG. 1) is further configured to display reminders to users to facilitate interaction, where the reminders may be triggered by certain events (e.g., an upcoming birthday).

Additional features relating to the photo presentation template 124 viewed by the participants of the instant messaging session are now described. Reference is made back to FIG. 2. As discussed earlier, the photo presentation template 124 sent to each contact via the invitation 123 will initially look the same on each display of the various instant messaging systems 102a-102N. Each contact may then freely modify the appearance of the photo presentation template 124 shown on their respective display.

In accordance with some embodiments, the digital photo presentation template 124 sent via the invitation 123 may be automatically generated or selected by the instant messaging system 102 (as opposed to being selected by the user). Specifically, each instant messaging system 102a-102N may be configured to adaptively select and/or modify visual attributes of the initial digital photo presentation template 124 shown on the respective display, where the visual attributes may include but are not limited to, the number of panels, the size/shape of panels, the size/shape of the overall photo presentation template 124, and so on. Furthermore, visual attributes of the digital photo presentation template 124 may be modified by each instant messaging system 102a-102N once participants of the instant messaging session begin uploading their respective photos to the digital photo presentation template 124. In this regard, visual attributes of the digital photo presentation template 124 may be automatically selected and/or modified in the beginning prior to being sent to contacts invited to participate in an instant messaging session. However, visual attributes of the digital photo presentation template 124 may also be modified by each instant messaging system 102a-102N once participants begin uploading content, where the visual attributes are dynamically modified in accordance with the content.

Typically, photos uploaded by participants will be displayed in the digital photo presentation template 124 according to time. However, in accordance with some embodiments, each instant messaging system 102a-102N may generate the digital photo presentation template 124 in the form of a photo collage layout based not only on time but also based on the number of photos uploaded to the digital photo presentation template 124. For some embodiments, the number of panels in the digital photo presentation template 124 will track the number of uploaded photos. Thus, as more photos are uploaded, more panels are automatically added to the digital photo presentation template 124 by the instant messaging system 102a-120N. For some implementations, no additional panels are added once a threshold number of photos have been uploaded.

For embodiments, each instant messaging system 102a-102N may modify visual attributes of the photo presentation template 124 based on the most popular photos. For example, each instant messaging system 102a-102N may be configured to present an N-panel photo collage displaying the N most popular photos, where the popularity of photos may be gauged based on the feedback (e.g., comments, number of "likes", number of views) received for each photo. For embodiments, each instant messaging system 102a-102N may modify visual attributes of the photo presentation template 124 based on the upload time. For example, each instant messaging system 102a-102N may be configured to present an N-panel photo collage displaying the N latest photos that were uploaded. For embodiments, each instant messaging system 102a-102N may modify visual attributes of the photo presentation template 124 based on the particular participant(s) uploading the photos. For example, each instant messaging system 102a-102N may be configured to present an N-panel photo collage displaying a representative photo for the N most active uploaders of photos.

Figure 18:
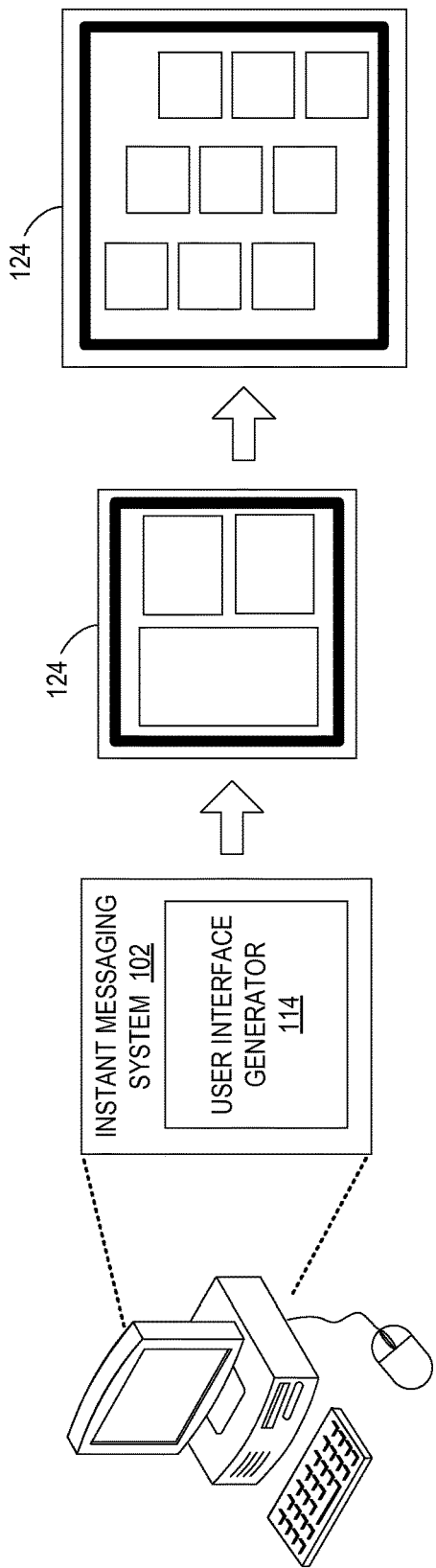
FIG. 18 illustrates an example user interface wherein visual attributes of a photo presentation template are automatically modified by the instant messaging system according to various embodiments of the present disclosure.

For some embodiments, the visual attributes of the photo presentation template 124 include the size and/or shape of panels within the photo presentation template 124. Thus, the size and/or shape of the panels may be dynamically modified according to the various criteria described above. Specifically, the size and/or shape of the panels may be dynamically modified according to the number of uploaded photos, the popularity of photos, feedback (e.g., comments, "likes", number of views) received for each photo, and so on. To illustrate, reference is made to FIG. 18, which illustrates an example user interface wherein visual attributes of a photo presentation template 124 are automatically modified by the user interface generator 114 in the instant messaging system 102. In the example shown, the number of panels in the photo presentation template 124 is increased by the user interface generator 114 to accommodate additional participants who have joined the instant messaging session. Furthermore, the overall size of the photo presentation template 124 has been increased to fit the additional panels that have been added. The visual attributes of the photo presentation template 124 may also be based on location/positioning data associated with photos. For example, photos with location/positioning data closer to the current location of a particular instant messaging system 102a-102N could be presented in a larger panel, whereas photos with location/positioning data farther away could be presented in a smaller panel.

For some embodiments, the visual attributes of a photo presentation template 124 may be modified according to the type of computing device in which the instant messaging system 102a-102N is implemented. For example, the size of the digital photo presentation template may be modified to be larger/longer than the display area when the instant messaging system 102a-102N is embodied as a mobile phone. In such instances, the user may simply navigate the photo presentation template 124 by using a dragging motion or other gesture via a touchscreen interface in order to surface additional photo panels.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method implemented in an instant messaging system for providing an interactive photo sharing platform, comprising:

transmitting an electronic invitation to at least one contact at a corresponding instant messaging system, wherein the electronic invitation includes a selected digital photo presentation template comprising a plurality of panels, wherein the electronic invitation specifies a permission level on both a contact-by-contact basis and a panel-by-panel basis, the permission level restricting an activity level of each corresponding contact with respect to at least one of the plurality of panels in the selected digital photo presentation template;

uploading digital photos to a media content server; and accessing digital photos shared by the at least one invited contact, wherein the digital photo presentation template shown on each corresponding instant messaging system is customizable by each of the at least one contact based on the permission level, wherein the digital photos are arranged in each of the panels of the presentation template according to at least one viewing criterion specified by a respective user of each corresponding instant messaging system, wherein the permission level specifies whether each of the at least one contact has permission to upload digital photos to at least one panel, and wherein each of the at least one contact is able to specify, via the corresponding instant messaging system, at least one viewing criterion for arranging digital photos in each of the panels of the digital photo presentation template.

2. The method of claim 1, wherein the digital photo presentation template included in the invitation is selected by a user of the instant messaging system.

3. The method of claim 1, wherein the digital photo presentation template included in the invitation is selected by the instant messaging system transmitting the invitation.

4. The method of claim 1, wherein each of the at least one contact is able to modify, via the corresponding instant messaging system, an appearance of the digital photo presentation template, wherein the modifications are specified by the corresponding contact.

5. The method of claim 1, wherein each of the at least one contact is able to modify, via the corresponding instant messaging system, an appearance of the digital photo presentation template, wherein the modifications are automatically selected by the corresponding instant messaging system.

6. The method of claim 4, wherein modifying the appearance of the digital photo presentation template comprises at least one of: rearranging placement of at least one of the panels within the digital photo presentation template; resizing at least one of the panels; inserting objects into the digital photo presentation template; hiding at least one of the panels; and adding additional panels.

7. The method of claim 1, wherein the at least one viewing criterion comprises at least one of: time, location, objects, and depicted individuals.

8. The method of claim 1, wherein the digital photo presentation template is shown in conjunction with a user interface for facilitating instant messaging communication with the at least one contact.

9. The method of claim 1, further comprising transmitting a request to unfriend one of the at least one contact, wherein responsive to the request, restricting access by the at least one contact associated with the unfriend request to the digital photos of the digital photo presentation.

10. The method of claim 1, wherein each panel comprises a digital photo browser for surfacing digital photos using at least one of: a swiping motion with a finger in contact with a touchscreen interface and a swiping motion using a pointing device.

11. The method of claim 1, further comprising:
displaying a calendar graphic for accessing digital photos;
obtaining user input comprising selection of a day in the calendar graphic; and
displaying digital photos based on the selected day, wherein the displayed digital photos have time stamps corresponding to the selected day.

12. A computing device configured as a media server in an interactive photo sharing platform, comprising:
a memory device storing instructions; and
a processor coupled to the memory device and configured by the instructions to at least:
receive and process an electronic invitation generated by an instant messaging system intended for a group of contacts, wherein the electronic invitation includes a selected digital photo presentation template comprising a plurality of panels, wherein among the group of contacts, at least one contact is allotted at least one panel, wherein the electronic invitation specifies a permission level on both a contact-by-contact basis and a panel-by-panel basis, the permission level restricting an activity level of each corresponding contact with respect to at least one of the plurality of panels in the selected digital photo presentation template, and wherein each of the group of contacts has a corresponding instant messaging system, the processor being further configured for forwarding the invitation to each of the contacts; and
store digital photos uploaded by each of the instant messaging systems and grant access to the stored digital photos by the contacts based on corresponding permission levels specified in the processed electronic invitation, wherein the digital photo presentation template shown on each corresponding instant messaging system is customizable by each of the at least one contact based on the permission level, wherein at each instant messaging system, the digital photos are arranged in each of the panels of the presentation template according to a viewing criterion specified by each instant messaging system, wherein each corresponding permission level specifies whether each of the contacts has permission to upload digital photos to at least one panel, and wherein each of the contacts is able to specify, via the corresponding instant messaging system, at least one viewing criterion for arranging digital photos in each of the panels of the digital photo presentation template.

13. The computing device of claim 12, wherein the permission level specifies whether each of the at least one contact allotted at least one panel has permission to share digital photos using their allotted at least one panel.

14. The computing device of claim 12, wherein each of the group of contacts is able to modify, via the corresponding instant messaging system, an appearance of the digital photo presentation template.

15. The computing device of claim 12, wherein each panel comprises a digital photo browser for surfacing digital photos using at least one of: a swiping motion with a finger in contact with a touchscreen interface and a swiping motion using a pointing device.

16. A method implemented in a media content server, comprising:
receiving and processing an electronic invitation generated by an instant messaging system intended for a group of contacts, wherein the electronic invitation includes a selected digital photo presentation template comprising a plurality of panels, wherein among the group of contacts, at least one contact is allotted at least one panel, panel, wherein the electronic invitation specifies a permission level on both a contact-by-contact basis and a panel-by-panel basis, the permission level restricting an activity level of each corresponding contact with respect to at least one of the plurality of panels in the selected digital photo presentation template, and wherein each of the group of contacts has a corresponding instant messaging system;
forwarding the invitation to each of the contacts;
storing digital photos uploaded by each of the instant messaging systems; and
granting access to the stored digital photos by the contacts based on corresponding permission levels specified in the processed electronic invitation, wherein the digital photo presentation template shown on each corresponding instant messaging system is customizable by each of the at least one contact based on the permission level, wherein at each instant messaging system, the digital photos are arranged in each of the panels of the presentation template according to a viewing criterion specified by each instant messaging system, wherein each corresponding permission level specifies whether each of the contacts has permission to upload digital photos to at least one panel, and wherein each of the contacts is able to specify, via the corresponding instant messaging system, at least one viewing criterion for arranging digital photos in each of the panels of the digital photo presentation template.

17. The method of claim 16, wherein the permission level specifies whether each of the at least one contact has permission to share digital photos using their allotted at least one panel.

18. The method of claim 17, wherein each of the group of contacts is able to modify, via the corresponding instant messaging system, an appearance of the digital photo presentation template.

19. The method of claim 18, wherein modifying the appearance of the digital photo presentation template comprises at least one of: rearranging placement of at least one of the panels within the digital photo presentation template; resizing at least one of the panels; inserting objects into the digital photo presentation template; hiding at least one of the panels; and adding additional panels.

20. The method of claim 16, wherein the digital photo presentation template is shown in conjunction with a user interface for facilitating instant messaging communication among the instant messaging systems.

21. The method of claim 16, further comprising receiving a request to unfriend one of the contacts, wherein responsive to the request, restricting access by the contact associated with the unfriend request to the digital photos of the digital photo presentation.

22. The method of claim 16, wherein each panel comprises a digital photo browser for surfacing digital photos using at least one of: a swiping motion with a finger in contact with a touchscreen interface and a swiping motion using a pointing device.

\* \* \* \* \*